Oct. 7, 1952  A. H. ROCHE ET AL  2,613,284
HOUSING FOR APPARATUS INSTALLED IN SUBAQUEOUS CABLES
Filed Aug. 10, 1948
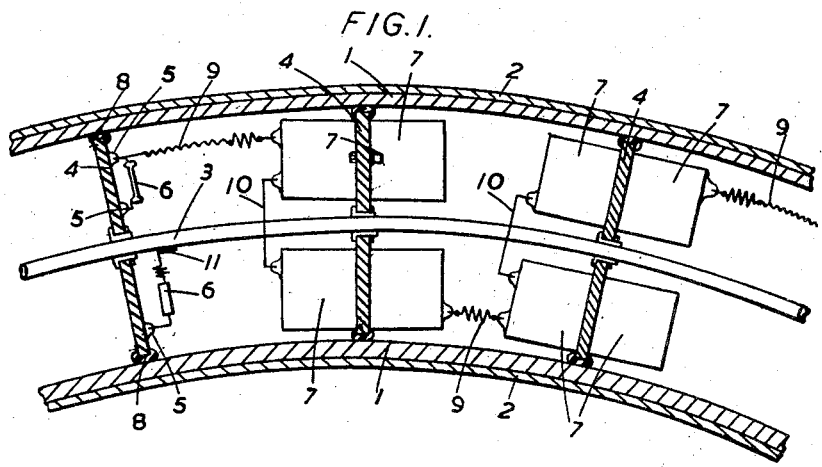
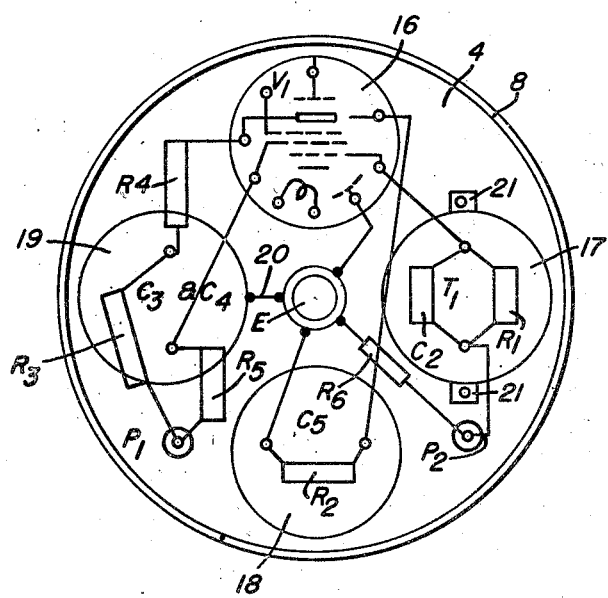
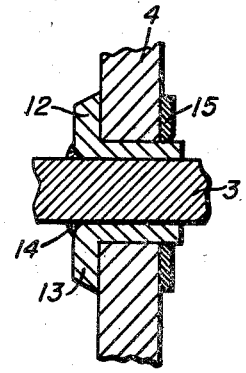
Inventors
ALLEMAN HOLLY ROCHE
FREDERICK ORMESHER ROE
By
Attorney Patented Oct. 7, 1952

2,613,284

UNITED STATES PATENT OFFICE 2,613,284

HOUSING FOR APPARATUS INSTALLED IN SUBAQUEOUS CABLES

Alleman Holly Roche and Frederick Ormesher Roe, London, England, assignors to International Standard Electric Corporation, New York, N. Y., a corporation of New York Application August 10, 1948, Serial No. 43,358
In Great Britain August 15, 1947

3 Claims. (Cl. 179—171)

This invention relates to submersible amplifying repeaters for use in connection with subaqueous telecommunication cables.

The efficient communication of intelligence by electric means over considerable lengths of subaqueous cables such as those connecting territories separated by wide ocean spaces presents considerable difficulty. The mechanical requirements lead to cable designs having attenuations per unit length much higher than those of land cables not subject to high hydrostatic pressure or the mechanical strains involved in laying cables in deep water.

It is not, for mechanical, electrical and economic reasons, practicable to reduce these attenuations by increasing the overall diameters of such cables beyond certain rather definite limits.

In the case of land cables it is normal to insert amplifiers or repeaters at intervals ranging from say three or four miles to fifty miles or more according to the frequencies to be transmitted and the type of cable in use. These repeaters amplify and retransmit the signals after they have suffered attenuation over the preceding cable section. In the case of subaqueous cables the provision of such repeaters clearly presents very great difficulty unless convenient islands are available on which the amplifying equipment, power supply means etc. can be installed.

Proposals have been made over a very long period for the provision of intermediate repeater stations in long subaqueous cables, either by installing the repeaters in floating structures such as rafts or buoys, or for the installation of the necessary equipment in water tight cases submerged with the cable itself and possibly housed within the protective armouring structure of the cables. Submerged intermediate repeaters would obtain their power supply from the cable terminals through a conductor or conductors included in the cable, which conductor or conductors might also carry signalling currents. Such submerged repeaters have already been used to a limited extent in relatively shallow water but so far as is known no repeaters have yet been installed in ocean depths, although a number of designs have been proposed intended to overcome the difficulties inherent in such projects.

Briefly, these difficulties are that the amplifier must be contained in a water-tight casing which will not collapse under the high hydrostatic pressures at the ocean bottom, which may exceed 3 tons per square inch, which will permit of the connections between the cable and the repeater being made in a permanently watertight manner, and which will withstand the very severe mechanical stresses involved in laying it out from a cable laying ship attached to the cables, and lowering it to the ocean bed.

A novel construction has now been developed for a repeater suitable for use in deep water and adapted to be built into the cable and payed out from the cable laying ship as part of the cable. The casing containing the repeater must in fact be sufficiently flexible to be bent round the ship's paying out drum and strong enough to withstand the tension of the cable during paying out.

British Patent Specification No. 563,158 discloses a construction in which the components forming the repeater are mounted in a plurality of closed cylindrical containers arranged axially within a flexible casing.

The construction now proposed provides a submersible repeater in which it is not necessary to mount the electrical components forming the repeaters in separate containers. An impervious pressure proof cylindrical casing is constructed with suitably closed ends, there being installed within the so-formed cylinder a central member consisting of a metallic rod or tube lying along the axis of the cylinder. This central member carries a plurality of discs mounted at suitable intervals along its length with their planes perpendicular to the axis of the central member. These discs serve to retain the central member correctly positioned along the axis of the cylindrical casing and each disc is preferably provided with damping means such as a rubber ring or a torcidal spring carried in an annular groove in the periphery of the disc and engaging the inner surface of the casing of the repeater. These damping means are such that they permit the central member and discs to be inserted within the casing after the latter is assembled but will minimise any vibration of the discs relative to the casing when the complete unit is being handled. The various electrical components such as resistances, condensers, inductances, coils, valves, etc. are mounted on the discs, both sides of the discs being available for this purpose. The discs may be made of a suitable insulating material or alternatively of metal, the latter being preferred when electrical screening is desirable between components on opposite sides of a disc.

The necessary electrical connections between components on different discs may be made by means of flexible wire springs or in other similar flexible manner.

The metallic central member can conveniently be connected to the external protection system of the cable to serve as an earthing means for the various components. If the central member is a hollow tube, insulated connecting wires can be carried within it, holes in the wall of the tube being provided to allow the wire to be brought out where necessary. The power supply for the repeater is supplied over the cable conductors.

The pressure proof casing consists of a steel housing constructed of a succession of abutting and co-operating rings in known manner, a thin impervious metallic shell of suitable flexible metal such as copper being provided over the outside of the pressure resisting rings, this shell being fitted with suitable water-tight glands at its ends through which the main cables are led into the casing. In some cases it may be desirable to use a strong light alloy in place of steel for the pressure resisting rings.

The main armouring of the cable is carried over the outside of the casing, additional armour wires being laid in known manner over the casing when necessary to allow for the increased diameter over the casing as compared with that of the main cable.

The present invention therefore provides a submersible amplifying repeater for use in connection with subaqueous telecommunication cables of the kind in which the repeater is contained within a flexible hollow cylindrical pressure resisting hermetically sealed container characterised in this that the electrical components forming the amplifier are mounted on discs supported on, and in planes perpendicular to the axis of, a central cylindrical member coaxially positioned within said cylindrical container.

The nature of the invention will be better understood from the following description taken in conjunction with the accompanying drawings in which:

Fig. 1 shows a portion of a submersible amplifying repeater according to the invention.

Fig. 2 shows a detail from Fig. 1 on a larger scale.

Fig. 3 is a schematic circuit illustrating how the components of an amplifier can be mounted in such a repeater.

Fig. 1 shows partly in section a length of a repeater housing. The protection against collapse under high hydrostatic pressure consists of an articulated steel casing 1 (illustrated in the aforementioned British patent) enclosed within a thin hermetically sealed shell 2 of copper or other suitable flexible metal. The construction of the articulated steel casing forms no part of the invention and is not shown in detail, it is built up of a succession of steel rings the ends of the rings being so shaped that they can co-operate. For example one end of each ring can be formed as a convex curve and the other end as a concave curve so that even when the repeater housing is flexed, as shown, the ends do not come completely out of engagement so that the thin shell 2 cannot be forced in between successive segments by the external pressure.

Although the articulated casing 1 is referred to as being made of steel it can in some circumstances be made of a strong light alloy.

Coaxially positioned with the housing 2 is a central member 3 running the whole length of the repeater which can conveniently be a copper rod or tube.

Mounted on this central member 3 are a number of discs 4, suitably spaced apart along the central member to allow space for the components of the repeater which are mounted on the discs.

These discs are firmly attached to the central member a convenient method of attaching them being shown in detail in Fig. 2 to be described later.

The edges of the discs are provided with resilient buffers 8 which may be either rubber rings or toroidal springs carried in grooves recessed in the edges of the discs. These buffers serve to prevent undue vibration of the discs while the repeater is being handled but permit of a certain amount of movement when the repeater is being flexed.

The connections between the various components are made in several ways. When components to be connected are mounted on opposite sides of one disc connections can be made through the discs.

When components on adjacent discs are to be connected flexible spring connecting leads 9 are used.

External connections between components mounted on one side of one disc can be made by comparatively rigid wire leads 10.

Commonly the central member 3 will be connected to earth through the pressure resisting and hermetically sealed casing or by being connected to an earthed conductor in the associated cable. Components which need to be earthed can therefore be connected to the central conductor as shown at 11. When a tubular central member is used connecting bands can be passed along the interior of the tube and brought out through holes drilled in the walls of the tube where required. This provides convenient means for interconnecting components which are not on adjacent discs.

In Fig. 2 there is shown a method for fixing the discs to the central member. A ring shaped member which may be in two halves 12, 13 is placed around the central member 3 at the desired position forming a close fit. This ring can then be welded to the central member as shown at 14, the central member acting as return conductor. The disc 4 is then put in position over the body of the ring and a metal retaining ring 15 is then pressed up against the disc and soldered or welded to the central member.

In order to simplify Fig. 1, only two components have been shown mounted on one side of each disc and these have generally been represented as cylindrical or rectangular cases. Since the discs on which these components are mounted are circular it can be seen that four or more components can be mounted on each side of each disc. Furthermore these components need not have circular basis since the method of mounting lends itself to the use of any standard components.

In Fig. 3 there is shown in a diagrammatic form a layout for the input circuit of a conventional feedback amplifier. Other components forming part of the circuit would be mounted on other discs or on the back of the disc shown. In the figure the disc 4 surrounded by its resilient buffer ring 8 has mounted on it a number of components 16, 17, 18, 19 which are represented as enclosed within cylindrical cases but which, as explained above, can be of any convenient shape. Component 16 comprises a pentode valve VI shown with its external shielding earthed to the central member E, constituted by the central member 3 shown in Fig. 1. Component 17 comprises the input transformer $T_1$, represented as enclosed in a cylindrical casing and having its output terminals shunted by a resistance $R_1$, and a condenser $C_2$ which may be contained within the case. Component 18 comprises a large by-pass condenser $C_5$ shunted by a resistance $R_2$ and contained in a cylindrical case. Component 19 comprises two condensers $C_3$ and $C_4$ within a cylindrical case, the midpoint of these condensers being earthed by lead 20. $P_1$ is a terminal used as soldering junction, the HT potential being applied to the terminal while the feedback loop is completed at terminal $P_2$ which is connected to earth through resistance $R_6$.

$R_3$, $R_4$, and $R_5$ represent resistances included in the leads interconnecting external terminals of the various components. The disc 4 in this example may either be of metal in which case terminals $P_1$ and $P_2$ would be insulatingly mounted thereon or of insulating material. The method of mounting the components on the disc 4 is quite conventional comprising lugs 21 as shown in the case of component 17 held down by a set screw or similar means.

The arrangement of Fig. 3 is only given as an example of how electrical equipment included in a submersible amplifying repeater can be mounted on discs according to the invention and the input circuit shown is no part of the invention.

What is claimed is:

1. A submersible amplifying repeater for use in connection with subaqueous telecommunication cables comprising a flexible pressure resisting cylindrical housing, an elongated central support member coaxially positioned within said housing, a plurality of solid disc members, each of said members having a centrally located aperture of substantially the same circumference as said central member, said discs being mounted on said central member within said housing in planes perpendicular to the axis of said central member, a resilient buffer fastened to the periphery of each of said discs so that the disc including the buffer fits snugly inside said housing, a plurality of circuit components mounted on said disc members, and means for flexibly connecting respective ones of said circuit components mounted on different discs to each other.

2. A submersible repeater for use with subaqueous telecommunication cables comprising a sealed flexible pressure resisting cylindrical housing, a central tubular member coaxially positioned within said housing, a plurality of solid mounting discs, each of said members having a centrally located aperture of substantially the same diameter as the central tubular member, said discs being secured to said central member at predetermined points along the axis of said member, said mounting discs having damping means fastened on their periphery and positioned to snugly engage the inner wall of said housing, a plurality of circuit components mounted on each of said discs, means for flexibly connecting respective circuit components of said discs to each other, and means for supplying electrical energy to said circuit components.

3. A submersible repeater as set forth in claim 2 wherein said means for supplying electrical energy to said circuit components comprises a plurality of conducting lines positioned within said central tubular member, said member being provided with access holes adjacent said mounting discs for connecting circuit components on respective discs to said conducting lines.

ALLEMAN HOLLY ROCHE.
FREDERICK ORMESHER ROE.

REFERENCES CITED

The following references are of record in the file of this patent:

UNITED STATES PATENTS

| Number | Name | Date |
|---|---|---|
| 1,781,124 | Nein | Nov. 11, 1930 |
| 2,170,050 | Gandtner | Aug. 22, 1939 |
| 2,342,897 | Goldstine | Feb. 29, 1944 |
| 2,352,158 | Bishop | June 27, 1944 |
| 2,421,635 | McArthur | June 3, 1947 |
| 2,448,713 | Hansell | Sept. 7, 1948 |
| 2,465,069 | Dean | Mar. 22, 1949 |
| 2,471,465 | Hasselt | May 31, 1949 |